United States Patent Office 3,471,157
Patented Oct. 7, 1969

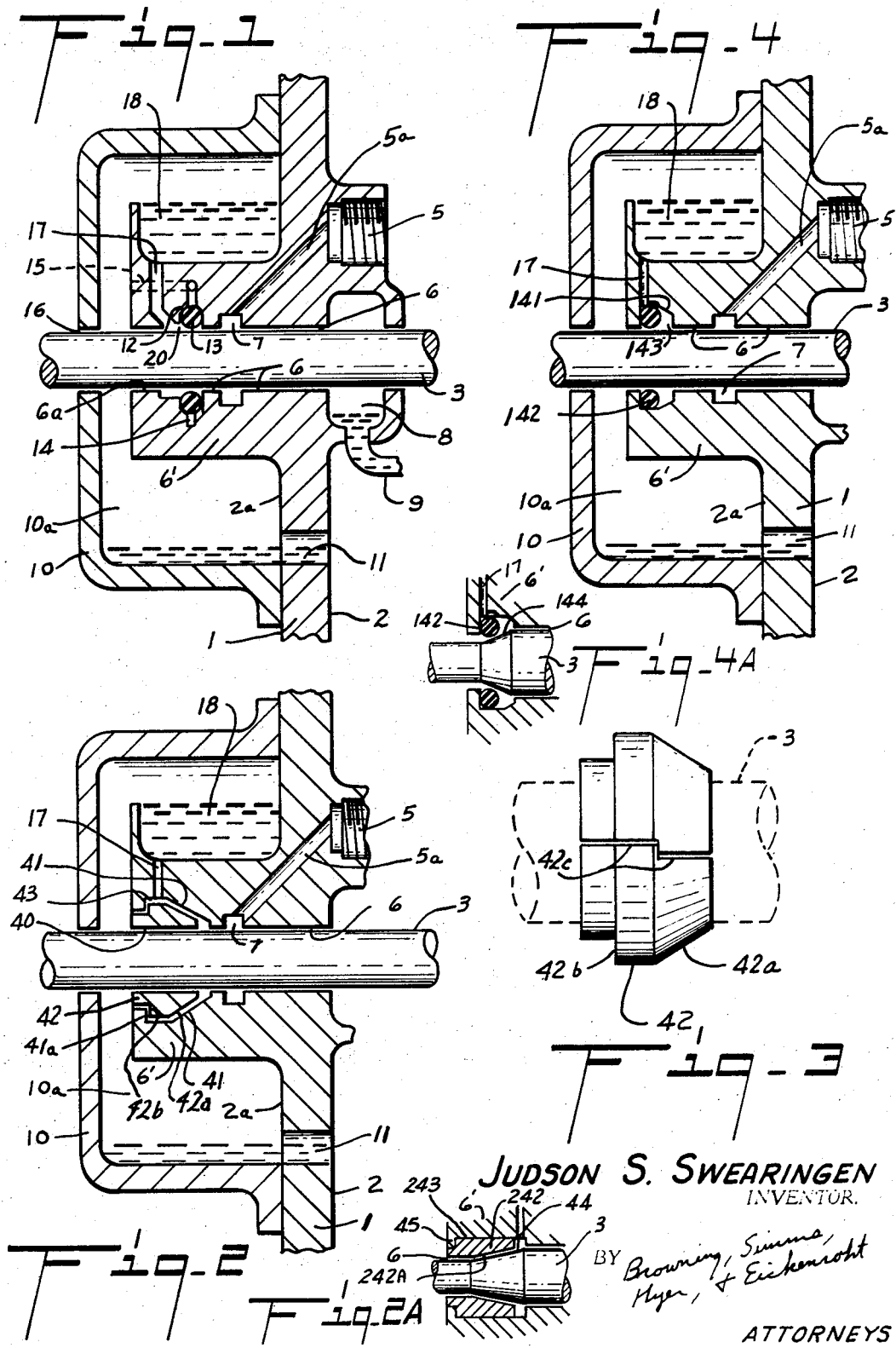

3,471,157
SHAFT SEAL
Judson S. Swearingen, 2235 Carmelina Ave.,
Los Angeles, Calif. 90064
Filed Oct. 7, 1966, Ser. No. 585,063
Int. Cl. F16j 15/40, 15/44, 15/00
U.S. Cl. 277—17                                    11 Claims

ABSTRACT OF THE DISCLOSURE

A rotary shaft seal is disclosed for sealing a clearance between the shaft and a chamber wall through which the shaft passes to prevent leakage of a confined fluid from said chamber through said clearance. The seal includes a sealing fluid injected under pressure into said clearance and mechanical sealing means movable in and out of sealing engagement with the shaft in response to the relative pressures of the sealing fluid and the confined fluid so that the mechanical sealing means seals the clearance in the absence of the sealing fluid. Absent the mechanical sealing means, temporary sealing may be provided by accumulating an amount of sealing fluid in an accumulator during presence of normal sealing fluid pressure, the accumulator being located so that the hydrostatic pressure of the accumulated fluid will cause the fluid to seal the clearance for a predetermined period of time after loss of or a drop in, sealing fluid pressure. The accumulator may be used in conjunction with the mechanical sealing means so that said means also responds to the hydrostatic head of the accumulated fluid.

---

This invention relates to a seal mechanism for a rotary shaft seal. It applies to seals in which the normal sealing requirements are provided by a sealing fluid injected between the shaft and a wall through which the shaft passes intermediate the inner and outer faces of such wall and under pressure greater than that of the fluid confined. By this invention an emergency seal is provided in response to existing confined pressures in the system fall-off of the sealing fluid pressure.

In high speed centrifugal compressors, turbines and the like, a rotating shaft is generally sealed, where it emerges from the pressurized case, by a fluid seal. By fluid seal is meant a seal which involves no mechanical rubbing contact between relatively moving parts, but rather a seal between relatively movable parts which are spaced from each other to provide a slight clearance between them, and in which this clearance is kept filled with a sealing fluid under pressure at least as great as the pressure of the confined fluid. With the pressure in the clearance at least as great as that of the confined fluid, there can be no flow of the confined fluid into the clearance and hence there can be no leakage thereof through the clearance. However, if for any reason, the pressure of the sealing fluid in the clearance falls below that of the confined fluid, the latter will flow into the clearance and eventually therethrough and there will be leakage. Such sealing fluid pressure drop may occur through failure of the supply thereof for any reason such as breakdown of equipment, power failure, or the like.

Although various methods for meeting this difficulty are in use, none has provided a simple or satisfactory solution to this problem. For example, several clamping means for emergency use are known, or in some instances the shaft is permitted to move axially against a seat.

One prior device uses a mechanical seal as an emergency seal for a liquid sealed rotary shaft. Sealing fluid pressure normally forces the mechanical seal out of engagement with the rotating shaft, while a spring tensioner is used to cause the mechanical seal to seal against the shaft during absence of sealing fluid pressure. Such an emergency seal requires critical adjustment of the spring tensioner and is not practical for use in systems in which the confined pressure or sealing pressures vary. Such devices also have the disadvantage that the mechanical seal and shaft may be damaged considerably by the seal rubbing against the shaft when sealing pressure drops off while the shaft is rotating at high speeds, and that leakage is permitted until the speed of rotation is sufficiently low to permit activation of the mechanical seal.

The present invention contemplates an emergency seal having a mechanical sealing means which seals in response to confined pressure in the system when the sealing fluid pressure falls therebelow, in combination with a liquid rotary shaft seal. A sealing fluid accumulator means, such as a reservoir of sealing fluid is preferably also provided for a temporary or short term lubrication and sealing fluid supply, under pressure as great as the confined fluid, to supply such lubrication and sealing fluid for a limited time in the event of failure of normal sealing fluid pressure.

It is thus an object of this invention to provide an emergency shaft seal in combination with a liquid rotary shaft seal in which emergency sealing is provided in response to pressures in the system when normal sealing fluid pressure is low or absent in the liquid rotary shaft seal.

It is another object of this invention to provide such a seal in which emergency sealing is provided by a mechanical seal and in which damage to the shaft or mechanical emergency seal is minimized during low sealing fluid pressure conditions even though the shaft is rotating at high speeds.

It is yet another object of this invention to provide such a seal that will operate in response to varying fluid pressure differentials.

A further object of this invention is to provide such a seal which accomplishes the above objects, yet is small, of simple construction, and inexpensive to replace, in relation to heretofore known emergency sealing devices.

Other objects and advantages of this invention will become apparent during the course of the following description and with reference to the accompanying drawings illustrating preferred embodiments of this invention and in which:

FIGURE 1 is a sectional view of one embodiment of this invention shown with a rotatable shaft and a housing;

FIGURE 2 is a sectional view of another embodiment of this invention shown with a rotatable shaft and housing;

FIGURE 2A is a fragmented section view of another embodiment of this invention shown with a rotatable shaft and a portion of a wall through which it passes;

FIGURE 3 is an elevational view of the ring construction of FIGURE 2; and

FIGURE 4 is a sectional view of still another embodiment of this invention shown with a rotatable shaft and housing, and FIGURE 4A is a fragmented section view of another embodiment of this invention shown with a rotatable shaft and a portion of a wall through which it passes.

In accordance with one form of this invention a mechanical sealing means is used in combination with the liquid seal in such a way that the mechanical sealing means is forced out of sealing relationship with a rotatable shaft having a radial clearance with a chamber wall through which it passes during normal operation, by the injection under pressure of sealing fluid into said clearance. In the absence of sealing fluid pressure the mechanical sealing means, under its own elasticity or under the action of confined fluid pressure or a combination thereof tends to move to sealing relationship with the shaft and seal the clearance.

In another form of this invention emergency sealing is provided by a sealing fluid accumulator means vented to the clearance for receipt of a predetermined amount of sealing fluid when sealing fluid is injected into the clearance between the shaft and the chamber wall. The accumulator means is so disposed that the accumulated sealing fluid has a hydrostatic head at the point in the clearance where the accumulator actually communicates therewith, which head is at least as great as the confined fluid pressure so that when the normal sealing fluid pressure is lower than that of the accumulated fluid, the accumulated fluid flows into the clearance for a predetermined time and prevents the passage therethrough of confined fluid.

In the preferred form of this invention the features of the emergency sealing provided by the mechanical sealing means and by the accumulator means are combined. In this way, when sealing fluid pressure is low, the pressure of the accumulated fluid will act to keep the mechanical sealing means from sealing relationship, for example, while the shaft is coasting from full speed to stop. Thus, excessive wear of the mechanical sealing means or the shaft can be avoided if this means normally rubs against the shaft in the absence of sealing fluid pressure. When the shaft stops rotating, and the accumulated fluid has drained off, the mechanical sealing means will then be in its position of sealing relationship with the shaft.

In the drawings there is illustrated a fragment of a wall 1 which is intended to represent the wall of a pressure vessel, the outer surface 2 of which will normally be exposed to atmospheric pressure or to some lower pressure and the inside surface 2a of which will normally be exposed to a confined fluid, such as a gas or perhaps even a low density liquid under high pressure as compared with that existing outside the wall. Passing through this wall is a shaft 3 intended for operation at extremely high speeds. The problem with which the present invention deals is that of providing a seal preventing the leakage of the high pressure fluid on the side 2a of the wall 1 lengthwise of the shaft to the exterior side 2 of this wall.

Because of the extremely high speed of operation of the shaft 3, the wall is provided with an opening through which the shaft may pass without actual physical engagement or contact between the shaft and the material of the wall. This opening is of such size as to leave a clearance 6 around the shaft within the opening through the wall so as to avoid such physical engagement that might produce excessive friction.

As is conventional, the wall 1 is formed with a thicker portion or hub 6' which may be integral with the wall and provides an elongated annular space, or clearance, about the shaft within the wall. The escape of confined fluid from the side 2a of the shaft to the side 2 thereof along the outside of the shaft through the opening by way of the clearance 6 is normally prevented by the presence within this clearance of a fluid under pressure greater than that of the confined fluid on the side 2a of the wall. Such fluid, known as sealing fluid, is suitably injected into the clearance 6 at a suitable point between the extremities of the opening through the wall. In this instance an opening is provided at 5 for receiving a connection bearing a suitable sealing fluid under pressure and this opening 5 is connected by means of a passageway 5a to an annular chamber 7 intermediate the ends of the opening through the wall. This chamber 7 is in the form of a channel cut into the material of the wall from the opening through which the shaft passes and thus the channel or annular chamber 7 opens toward the shaft.

Obviously, sealing fluid injected through the opening 5 and the passageway 5a into the chamber 7, if under pressure greater than that on the side 2a of the wall, will flow along the annular clearance 6 in both directions from the chamber 7 and the confined fluid on the side 2a of the wall will not be allowed to flow into the annular clearance 6 at all. If the pressure of the sealing fluid be exactly equal to that of the confined fluid, there still would be no flow of the confined fluid into the annular clearance nor would there be any flow of the sealing fluid from the chamber 7 toward the chamber containing the confined fluid. However, there would still be flow of the sealing fluid in the opposite direction from the chamber 7 in view of the fact that the pressure existing on the side 2 of the wall 1 is by hypothesis lower than that of the confined fluid.

As a practical matter, it would be most difficult to maintain the pressure in the chamber 7 at exactly the value of the confined fluid and in order to be sure that no leakage of confined fluid will take place, it is a practical necessity that the sealing fluid be maintained at some value higher than that of the confined fluid. This will result in flow of sealing fluid in both directions from the chamber 7.

In order to conserve the sealing fluid, there is provided at the outer end of the opening through the wall a chamber or enclosure 8 surrounding the shaft and providing a trap into which the sealing fluid flowing from the clearance 6 toward the side 2 of the wall will be trapped and from which it may be drained through any suitable drain conduit 9.

For the purpose of conserving the sealing fluid flowing in the opposite direction through the clearance 6, there is mounted on the side 2a of the wall 1 a second enclosure in the form of a box-like element 10 having within it a space providing a trap 10a. This box-like element surrounds the shaft 3 and has an opening 16 of sufficient size to pass the shaft without physical contact therewith. Sealing fluid flowing toward the side 2a of the wall 1 will, upon emerging from the end of the clearance between the shaft and wall, fall by gravity into the trap 10a from which it may be drained through the wall 1 by means of an opening 11. Suitable well-known means may be provided for controlling flow from this opening so that only the sealing fluid will escape and the confined fluid will be retained. The sealing fluid thus recovered through the conduit 9 and from the opening 11 will be conducted back to the source from which sealing fluid under high pressure is pumped to the port 5.

In accordance with the present invention, there is provided in the form illustrated in FIG. 1 a mechanical sealing means in the form of an O-ring, and an annular groove or chamber 12 is formed within the opening through the wall at a position between the chamber 7 and the chamber containing the confined fluid. This annular groove thus is in the form of a channel facing inwardly toward the shaft 3, and the O-ring 13 therein when in its expanded position, as illustrated in FIG. 1, leaves a clearance about the shaft within the O-ring. In this form of the invention it is desirable, if not necessary, that the O-ring be of such a size that it normally tends to embrace the shaft in engagement therewith, but is capable of being stretched by the exertion of a small force to expanded position illustrated in which it is out of contact with the shaft. In the inner portion of the groove 12 there is provided an annular chamber 20 in communication with the clearance 6 and the fluid therein, and in the outer portion of the groove 12 there is provided a further small circumferential chamber 14 which is in communication with a conduit 15, the other end of which is in communication with the confined fluid. Thus, the exterior portion or outer circumference of the O-ring 13 is exposed through the conduit 15 to the confined fluid and the pressure of the confined fluid will at all times be exerted on the outer circumference of the O-ring 13, tending to collapse it into engagement with the shaft. A second portion of the O-ring 13, such as its interior portion or inner circumference is exposed to the fluid in the clearance 6 and as long as the sealing fluid supply under pressure continues to be injected into the chamber 7 and flow in both directions therefrom, the pressure of this fluid within the clearance inside the O-ring 13 will, as heretofore explained, be necessarily greater than the pressure of the confined fluid and hence, will maintain the O-ring 13 in its expanded condition out of contact with the shaft 3.

Insofar as the structure thus far explained is concerned, a drop in pressure of the supplied sealing fluid for any reason would produce an immediate contraction of the O-ring 13 into contact with the shaft 3. If at such time the shaft 3 were rotating slowly or at a standstill, no harm would result, but if at such time the shaft 3 were rotating at extremely high speed, as it is in normal operation, there might well result such excessive friction as to cause damage to the shaft and perhaps destruction of the O-ring as well. If the failure of the sealing fluid pressure resulted from a break-down in the sealing fluid supply mechanism, while the other portion of the apparatus continued to function, there might thus result damage causing expensive shut-down.

In order to guard against an expensive shut-down resulting from such possible damage, this invention further provides for a sealing fluid accumulator means by which a temporary supply of sealing fluid may be provided both to maintain the seal against leakage through the clearance 6 and to maintain the mechanical sealing means in the form of the O-ring 13 out of mechanical contact for a period of time which would enable an operator or perhaps some mechanical control means to disconnect the shaft 3 from its source of rotating power and permit it to slow down to a stop or a sufficient degree to permit engagement of the mechanical seal provided by the O-ring 13 without likelihood of damage.

In FIG. 1 this last-mentioned arrangement includes a conduit 17 leading from the clearance 6 at a position immediately next to the chamber 12 containing the O-ring 13, but on the opposite side thereof from the chamber 7 so that sealing fluid in order to reach the conduit 17 must first pass through the clearance between the O-ring 13 and the shaft. This conduit 17 leads upwardly to a substantial elevation above the shaft 3 and is in communication with the interior of a reservoir 18 which is located at such level. This reservoir 18 may be arranged to store fluid under sufficient pressure to enable it to feed back into the clearance 6 with a pressure at least as great as that of the confined fluid and this may be accomplished in any one of a number of ways. The way illustrated is that of placing the reservoir 18 so that its upper extremity is open to the pressure of the confined fluid. Presuming that the confined fluid is either a gas so that its pressure at the top of the reservoir 18 would be substantially the same as that at the portion 6a of the clearance 6 which is exposed to the confined fluid, or that it is a fluid of lesser density than that of the sealing fluid, then if it be assumed that the reservoir 18 is filled with sealing fluid, the pressure exerted by such sealing fluid down through the conduit 17 at the lower end of such conduit where it enters the clearance 6 would be somewhat greater than that of the confined fluid at the point where the portion 6a of clearance 6 opens into the chamber containing the confined fluid.

With the arrangement just described, as long as the sealing fluid supply through the port 5 and the conduit 5a is maintained at normal pressure and sealing fluid is flowing in both directions through the clearance 6, the sealing fluid flowing toward the chamber containing the confined fluid will experience a pressure drop between the lower end of the conduit 17 and the point at which the clearance opens into the chamber containing the confined fluid. The pressure thus being greater at the lower end of the conduit 17 than that in the confined fluid, sealing fluid will be forced up through the conduit 17 into the reservoir 18 until the reservoir 18 becomes full. Now if the pressure of the sealing fluid should drop so that sealing fluid ceases to flow from the chamber 7 toward the confined fluid chamber, there will, of course, be an immediate tendency for the confined fluid pressure which is constantly exerted through the conduit 15 to contract the O-ring 13 about the shaft and into a mechanical engagement therewith. This tendency would be countered by the pressure of the sealing fluid collected in the reservoir 18 exerted through the conduit 17 and creating and maintaining a pressure within the interior of the O-ring which would be at least slightly greater than that of the confined fluid exerted on the outside of the O-ring and hence would maintain the O-ring in its expanded position clear of the shaft 3. This sealing fluid from the reservoir 18 would, because of its pressure being slightly greater than that of the confined fluid, flow not only through the interior of the ring 13 toward the trap 8, but would flow in the opposite direction toward the chamber containing the confined fluid and hence, prevent leakage of the confined fluid. It is to be noted that fluid from the reservoir 18 thus serves two functions which are interrelated, but which might be performed separately from one another. The one function is that of keeping the mechanical seal provided by the O-ring out of mechanical contact with the shaft for such period as the supply of the sealing fluid from the reservoir 18 may last. The size of the reservoir could be determined so as to make this time sufficient to allow the shaft 3 to be stopped or slowed down enough so that the O-ring could be contracted against it without damage. Even in the absence of any seal such as provided by the O-ring, however, the sealing fluid from the reservoir 18 fed down through the conduit 17 would flow in both directions from the entrance of such conduit into the clearance 6 and would provide a seal around the shaft 3 for some predetermined period of time. This would be useful even without the presence of the O-ring to close around the shaft upon exhaustion of the supply of fluid in the reservoir 18 because it might be a sufficient period of time to enable an operator to make repairs on the normal supply of sealing fluid and cause it to resume normal operation.

In FIGS. 2, 2A, 4 and 4A other forms of this invention are shown in which the mechanical sealing means is a different form of sealing ring. As in FIG. 1, the shaft 3 passes through the wall 1, the hub 6', and the box-like element 10 to form the clearance 6. Also, as described, atmospheric pressure or some lower pressure exists on the side 2 of the wall 1 and a higher confined pressure exists on the side 2a of the wall 2 and sealing fluid is injected into the clearance 6 through the chamber 7, conduit 5a and the opening 5. This sealing fluid is distributed along the clearance 6 in the manner described.

In accordance with the forms of the present invention shown in FIGURES 2, 2A, 4 and 4A, the zone in the clearance 6 in which the mechanical sealing means is disposed is of decreasing radial extent toward the point of injection of sealing fluid in the chamber 7. This zone is shown in FIGURE 2 as being composed of a chamber 43 which is formed within the opening through the wall to form a groove in the hub 6' at a position between the chamber 7 and the chamber containing the confined fluid, such as at the confined fluid end of the hub 6'. A portion of this chamber is open to the chamber containing the confined fluid and open to the shaft 3. A portion of this chamber is formed by a conical surface on either the chamber wall or the shaft or both and is shown in FIGURE 2 as formed by a conical chamber wall 41 having its apex toward the chamber 7 and an additional portion of this chamber is formed by a shoulder 41a on the chamber wall within the hub 6'.

The mechanical sealing means is shown in FIGURE 2 as an annular ring 42 around the shaft 3 and within the chamber 43. This ring is preferably made of rigid material having a higher modulus of elasticity such as metal, plastic, or carbon, than the material that the O-ring 13 is formed from. The outer surfaces of the ring 42 mate with the configuration of the chamber 43, for example, the ring 42 has an outer conical surface 42a opposed to the conical chamber wall 41 with its apex toward the chamber 7 and a shoulder 42b adjacent the shoulder 41a in the chamber wall. The ring is of such size that it floats in the chamber 43 and fits closely around, but does not touch, the shaft 3, so that a clearance 40 is formed between the ring 42 and the shaft 3. The ring may or may not normally be in contact with the surfaces of the chamber 43 wall, but should not be in such tight engagement therewith that it will not readily move axially therein toward wedging engagement with both the chamber wall and the shaft.

In this form of the invention when normal sealing fluid is present in the clearance 6', the ring 42 is pushed back away from the clearance 7 end of the chamber 43 and toward the shoulder 41a end thereof. In this manner the sealing fluid completely fills the clearance 6 and clearance 40 and seals against passage and confined fluid. When the sealing fluid pressure falls below that of the confined fluid, confined fluid rushes through the clearances between the ring 42 and the chamber 43 wall and the clearance 40. In this manner a drop in pressure of the confined fluid flowing through these clearances occurs, causing a pressure differential between confined fluid on the groove 7 side of the ring 42 and in the clearances 6 and 40 and the confined fluid in the chamber containing the confined fluid. This pressure differential urges the ring 42 toward the surface 41 and causes the surface 42a of the ring 42 to engage the surface 41. With increased pressure, the ring 42 is urged further against the surface 41 and is thus caused to compress to reduce its diameter and squeeze against the shaft 3 to effect a seal in the wall around the shaft.

If the ring 42 is not sufficiently elastic to compress the necessary amount as described above, it may have a stepped joint 42c, as shown in FIGURE 3, similar to that in a piston ring, or it may be a segmented ring with more than one such joint.

In FIGURE 2A, the conical surface is shown as a tapered section 44 on the shaft 6. A ring 242 is disposed in a chamber 243 in the hub 6', and the outer periphery of this ring mates with and may be in engagement with the surface 243 of the chamber wall which is shown as cylindrical. The ring 242 must be free to move longitudinally along the shaft in response to sealing fluid or confined fluid pressures. A shoulder 45 is provided to arrest this movement away from the tapered section 44.

The inner surface of the ring 242 includes a tapered section 242A so that when the ring 242 is urged toward the tapered section 44 on the shaft 6, a seal is effected by engagement of the tapered surfaces. The manner in which this form of the mechanical sealing means operates, in response to the sealing fluid or confined fluid pressure is identical to that of the form shown in FIGURE 2 except that the ring 242 is not required to be changed in diameter upon engagement under pressure with the tapered section 44 to effect the seal. In the embodiment of FIGURE 2A the seal is effected immediately upon engagement of the ring 242 and the shaft 6 and less pressures are required to effect this seal than required in the embodiment of FIGURE 2.

Also the sealing fluid accumulator means may be utilized with the forms of the invention shown in FIGS. 2 and 2A. In this embodiment the passageway 17 and reservoir 18 are provided in the manner shown in FIG. 1. Sealing fluid of a pressure at least as great as that of the confined fluid is stored in the manner described above in the description of the operation of FIG. 1 and upon a fall-off of the sealing fluid pressure to a pressure below that of the stored sealing fluid, the latter flows from the reservoir 18 into the chambers 43 and 243 and provides a temporary seal and keeps the rings 42 and 242 from engagement with the shaft 6 while the shaft is being slowed to a point where the rings 42 and 242 can safely be engaged.

Another form of this invention is shown in FIG. 4 which has a construction similar to that form shown in FIG. 2 except that the wedge-shaped ring 42 is replaced by an O-ring 142. In this form, the chamber 143 is not open to the chamber containing the confined fluid except through the clearance 6. The chamber 143 has a conical surface on its wall 141 with its apex toward the groove 7. The O-ring is slightly oversized so it moves freely away from this conical surface and thus away from the shaft. The O-ring fits closely around the shaft, but is not in contact therewith except when wedged into the conical portion of the chamber 143. This will occur when sealing fluid pressure falls below that of the confined fluid pressure so that the confined fluid rushes into the clearance 6 and urges the O-ring against the conical surface 141. In this manner the O-ring 142 is caused to compress against the shaft 3 to seal the clearance 6.

In FIGURE 4A, the conical surface is shown on the shaft as a tapered section 144. As the O-ring 142 engages this section of the shaft a seal is immediately effected, and the O-ring need not be compressed for engagement and sealing as in FIGURE 4.

The sealing fluid accumulator means may also be employed in combination with the O-ring 142 of FIGS. 4 and 4A to provide a temporary seal and keep the O-ring from engagement with the shaft 3 while the shaft is still rotating at high speeds. The operation of the mechanical sealing means of FIGS. 4 and 4A with the sealing fluid accumulator means is the same as described above in the description of the operation of FIGS. 2 and 2A and will not be repeated here.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a seal combination for preventing a leakage flow of confined fluid from a fluid chamber between a rotatable shaft extending through the chamber wall, and the chamber wall, said shaft and said wall having a radial clearance therebetween and said seal combination including means for injecting a sealing fluid into said clearance under pressure, the improvement comprising; a mechanical sealing means on the chamber wall movable into and out of sealing engagement with said shaft to seal said clearance; said mechanical sealing means having a portion of its surface exposed to the pressure of said confined fluid in a direction such that the action of said pressure will tend to move the mechanical sealing means into sealing relation to said shaft; and said mechanical sealing means having a second portion of its surface exposed to the pressure of said sealing fluid in a direction opposed to said confined fluid pressure so as to tend to hold said mechanical sealing means out of said sealing relation whereby a mechanical seal is provided only when sealing fluid pressure is too low to overcome said confined fluid pressure.

2. The seal combination of claim 1 further provided with means for storing a temporary supply of sealing fluid in communication with said clearance under pressure as great as that of the confined fluid and not greater than that of the normal sealing fluid in said clearance.

3. The seal combination of claim 1 in which the mechanical sealing means is disposed in an annular groove in the inner surface of that portion of the wall surrounding said shaft between the point of injection of said sealing fluid and the interior of the fluid chamber and said groove is open to said shaft.

4. The seal combination of claim 3 in which said groove has at least a portion of its outer wall conical with its apex toward the point of injection of said sealing fluid.

5. The seal combination of claim 1 in which said mechanical sealing means is an elastomer O-ring.

6. The seal combination of claim 1 in which said mechanical sealing means is a ring and the zone of said clearance in which it is disposed is of decreasing radial extent toward the point of injection of said sealing fluid.

7. The seal combination of claim 6 in which at least a portion of the chamber wall within the zone of said clearance is conical and the apex of such conical portion is toward the point of injection of said sealing fluid.

8. The seal combination of claim 7 in which the mechanical sealing means is a floating ring with at least a portion of its periphery conical and mating with the conical portion of said chamber wall.

9. In a seal combination for preventing a leakage flow of confined fluid from a fluid chamber between a rotatable shaft extending through the chamber wall, and the chamber wall, said shaft and said wall having a radial clearance and said seal combination including means for injecting a sealing fluid into said clearance under pressure greater than the pressure of the confined fluid, the improvement comprising sealing fluid accumulator means having conduit means in communication with said clearance for the receipt of a predetermined amount of sealing fluid when such sealing fluid is injected under pressure into said clearance, to provide a source of stored sealing fluid, said accumulator means disposed at a greater elevation than said clearance and in pressure communication with the confined fluid so that the sealing fluid accumulated therein will exert a hydrostatic pressure at the position where said accumulator communicates with said clearance at least as great as said confined fluid pressure, whereby said clearance is sealed against passage of confined fluid by said stored fluid for a predetermined period of time when said sealing fluid pressure falls below said confined fluid pressure.

10. The seal combination of claim 9 in which said clearance is sealed by said accumulated fluid for a period of time sufficient to allow said shaft to coast down from full speed to stop.

11. The seal combination of claim 9 further provided with a mechanical sealing means on the chamber wall movable into and out of sealing engagement with said shaft to seal said clearance, said mechanical sealing means having a portion of its surface exposed to the pressure of said confined fluid in a direction such that the action of said pressure will tend to move the mechanical sealing means into sealing relationship to said shaft; and said mechanical sealing means having a second portion of its surface exposed to the pressure of said sealing fluid in a direction opposed to said confined fluid pressure so as to tend to hold said mechanical sealing means out of said sealing relationship whereby when said sealing medium pressure is too low to overcome said confined fluid pressure said stored fluid seals against passage of said confined fluid, and when said stored fluid pressure is too low to overcome said confined fluid pressure a mechanical seal is provided to seal against passage of said confined fluid.

References Cited

UNITED STATES PATENTS

| 1,861,755 | 6/1932 | Rasmussen | 277—72 X |
| 2,810,592 | 10/1957 | Williams | 277—17 |
| 2,903,280 | 9/1959 | Cuny | 277—135 X |
| 3,001,806 | 9/1961 | Macks | 277—174 X |
| 1,258,218 | 3/1918 | Hicks | 277—15 X |

FOREIGN PATENTS 1,224,156  2/1960  France.

SAMUEL ROTHBERG, Primary Examiner

U.S. Cl. X.R.

277—72, 135, 174